United States Patent [19]

Giebel

[11] Patent Number: 5,168,148
[45] Date of Patent: Dec. 1, 1992

[54] AUTOMATIC GAIN CONTROL CIRCUIT

[75] Inventor: James R. Giebel, E. Northport, N.Y.

[73] Assignee: Symbol Technologies, Inc., Bohemia, N.Y.

[21] Appl. No.: 635,431

[22] Filed: Dec. 28, 1990

[51] Int. Cl.⁵ .............................................. G06K 7/10
[52] U.S. Cl. .......................... 235/462; 250/214 AG; 330/134
[58] Field of Search ................. 250/214 AG; 307/263, 307/264, 493; 330/134; 235/462

[56] References Cited

U.S. PATENT DOCUMENTS

| | | | |
|---|---|---|---|
| 2,673,899 | 3/1954 | Montgomery | 330/134 |
| 3,969,612 | 7/1976 | McJohnson | 235/462 |
| 4,251,798 | 2/1981 | Swartz et al. | 235/463 |
| 4,360,798 | 11/1982 | Swartz et al. | 235/463 |
| 4,387,297 | 6/1983 | Swartz et al. | 235/462 |
| 4,409,470 | 10/1983 | Shepard et al. | 235/472 |
| 4,422,049 | 12/1983 | Akagiri et al. | 330/134 |
| 4,460,120 | 7/1984 | Shepard et al. | 235/472 |
| 4,528,444 | 7/1985 | Hara et al. | 235/462 |
| 4,673,805 | 6/1987 | Shepard et al. | 235/472 |
| 4,736,095 | 4/1988 | Shepard et al. | 235/472 |
| 4,758,717 | 7/1988 | Shepard et al. | 235/472 |
| 4,760,248 | 7/1988 | Swartz et al. | 235/472 |
| 4,806,742 | 2/1989 | Swartz et al. | 235/472 |
| 4,816,660 | 3/1989 | Swartz et al. | 235/472 |
| 4,825,057 | 4/1989 | Swartz et al. | 235/472 |
| 4,835,374 | 5/1989 | Swartz et al. | 235/472 |
| 4,897,532 | 1/1990 | Swartz et al. | 235/467 |
| 5,107,140 | 4/1992 | Sherman | 307/358 |

FOREIGN PATENT DOCUMENTS

0201175 11/1984 Japan ................................... 235/462

Primary Examiner—John W. Shepperd

[57] ABSTRACT

In a laser scanning system, an automatic gain control (AGC) circuit for dynamically adjusting the gain of a receiver that is used to receive light reflected from a bar code. The AGC provides a fast adjustment to receiver gain so that the receiver can provide a decodable signal quickly. To accomplish the fast adjustment, the AGC circuit, in addition to sensing the final output of the receiver, includes an additional feedback path from an amplifier in the receiver that is located before the final amplification stage. The additional feedback has a negligible attack time, and adjusts receiver gain quickly, thereby minimizing the time required to reach steady state.

20 Claims, 5 Drawing Sheets

AUTOMATIC GAIN CONTROL CIRCUIT

BACKGROUND OF THE INVENTION

1. Field of the Invention

The present invention relates to laser scanning systems for reading bar code symbols, and more particularly, to an automatic gain control circuit for dynamically adjusting the gain of a receiver that is used to receive the light reflected from the bar code.

2. Discussion of the Prior Art

Typical bar code reading systems, such as the one described in U.S. Pat. No. 4,496,831, assigned to the same assignee as the present invention, generally comprise light source, an optic train including focusing lenses for directing the light source across a bar code symbol, and a sensing means for detecting reflected light from the target bar code symbol being scanned. The light source is usually a semiconductor laser diode. Light generated by it passes through the optic train which focuses the beam to impinge upon the scanning means which are mounted in the light path within the scanning head of the device. The scanning means sweeps the laser beam across the bar code symbol and comprises at least one scanning motor. Light reflecting means such as mirrors are mounted on the motor shaft to direct the beam through an outlet port to the symbol. The sensing means then detects and processes the light reflected off the symbol, and generally comprises photosensitive elements such as a semiconductor photodiode. The detected light is converted into an electrical signal and is then passed through a receiver where the signal is amplified, processed, and subsequently decoded.

Automatic Gain Control ("AGC") is presently used in laser scanning devices to dynamically adjust overall receiver gain. The use of AGC allows the laser scanning device to decode symbols over larger distances than would be possible if the receiver gain of the laser scanning device was fixed.

The AGC circuitry presently used in laser scanning devices requires many scans to correctly adjust overall receiver gain. This is because the response time of the AGC is dependent upon various factors including: the configuration of the target bar code symbol being scanned, the physical distance between the bar code symbol and the scanner, and the amount of ambient light present in the field of view of the scanner. For instance, depending upon the ambient light conditions and the bar code symbol being scanned, the AGC response time can range from several hundred milliseconds and, in extreme cases, can be as long as several seconds. An example of how long AGC response time can be is shown by department store cashiers who use a hand-held laser scanning gun to decode the bar code symbols present on the merchandise. In many instances, the cashier must repeatedly scan the same symbol until the correct decodable symbol is obtained.

The typical AGC that is used in bar code scanning devices controls receiver gain by monitoring and regulating the peak average value of the receiver's output signal. The receiver is comprised of several discrete amplifier stages that are connected in tandem to deliver a large overall gain from the input to the output of the receiver.

The AGC circuit senses the final output of the receiver, and adjusts the gain of one of the discrete amplifiers that is located in an early stage of amplification in the receiver. In effect, a feedback path is created from the output of the receiver through the AGC circuit to one amplifier that has an adjustable gain feature that the AGC circuit controls. This feedback allows the AGC circuit to regulate the output of the receiver at a constant amplitude despite any fluctuations in the magnitude of the input signal.

The AGC circuit peak detects and filters the output signal which results in a direct current (d.c.) voltage which is proportional to the average peak value of the received signal. The AGC circuit then compares this average peak value of the output signal to a fixed d.c. reference voltage and dynamically adjusts receiver gain in an attempt to reduce any difference between these two voltages.

The average peak value of the output voltage is used because it makes the AGC impervious to short duration large excursions of the output voltage which otherwise would introduce large errors in receiver gain. For example, a signal received by a bar code scanner could contain undesired receiver output excursions that result from reflections off of packaging material that is adjacent to the bar code being scanned. In sensing the average peak output, the AGC will be less sensitive to these undesirable signal excursions. Unfortunately, in order to accurately determine what the average peak receiver output is, the AGC requires many cycles of the input signal to reach a steady state gain setting. In some instances, it could take a long time for the AGC to finally set receiver gain properly.

The amount of time the AGC requires to reach steady state, for a given input, is commonly referred to as "attack time". Reducing the attack time in an AGC circuit that has a single feedback path from the receiver, however, will also increase the error in the steady state output signal amplitude. Traditionally, the circuit designer in designing an AGC, trades off accuracy for any reduction in attack time. The end result of the design is an AGC that is inherently slow due to the accuracy requirements imposed by the system.

In addition to the limitation imposed by attack time, the AGC response time is limited by the presence of large low-frequency components in the output signal. Large low-frequency components can cause the output amplifier to saturate. As a result, the higher frequency components of the output voltage signal which are used to set receiver gain, are clipped and therefore will not contribute to the gain setting action of the AGC. In extreme cases, the saturation of the output amplifier could cause large errors in the gain setting of the receiver which could result in a failure to decode the symbol being scanned.

In view of the above-mentioned features and limitations of typical AGC circuitry that degrade the receiver's steady state response time, an AGC circuit which quickly adjusts overall receiver gain would be highly desirable. It is accordingly an object of the present invention to fulfill this need by providing an automatic gain control circuit with the capability of providing a decodable signal within a much shorter period of time.

SUMMARY OF THE INVENTION

The present invention is directed to an automatic gain control circuit for dynamically adjusting overall receiver gain in a bar code laser scanning system. This automatic gain control circuit provides a "quick" adjustment to overall receiver gain so that the receiver can provide a decodable signal within a much shorter period of time thereby improving receiver response time. To accomplish the quick adjustment, the automatic gain control circuit includes an additional feedback path from an amplifier in the receiver that is located before the final amplifier stage. The output of this amplifier, like the final output of the receiver, represents the signal that is received from the target bar code, however, the signal at this output is smaller in magnitude than the final receiver output.

This addition feedback path from the receiver has negligible attack time and is used to improve the adjustment rate of the receiver gain by providing a fast estimate of what the steady state gain of the receiver should be. This additional feedback path also introduces a d.c. signal which is used to initialize the AGC electronics. As the AGC approaches steady state, this additional feedback path becomes isolated from the AGC which allows the primary feedback path from the receiver output to be used to accurately fine tune receiver gain.

As will be described in detail hereinbelow, the AGC circuit of the present invention provides for an improvement in AGC response time thus rendering the receiver response time more impervious to factors such as the distance the bar code is from the scanner, the amount of ambient light present in the field of view of the scanner and the nature of the bar code symbol being scanned. In addition to improving AGC response time, the AGC circuit of the invention dynamically adjusts overall receiver gain more efficiently without compromising accuracy.

DETAILED DESCRIPTION OF THE PREFERRED EMBODIMENT

Figure 1:
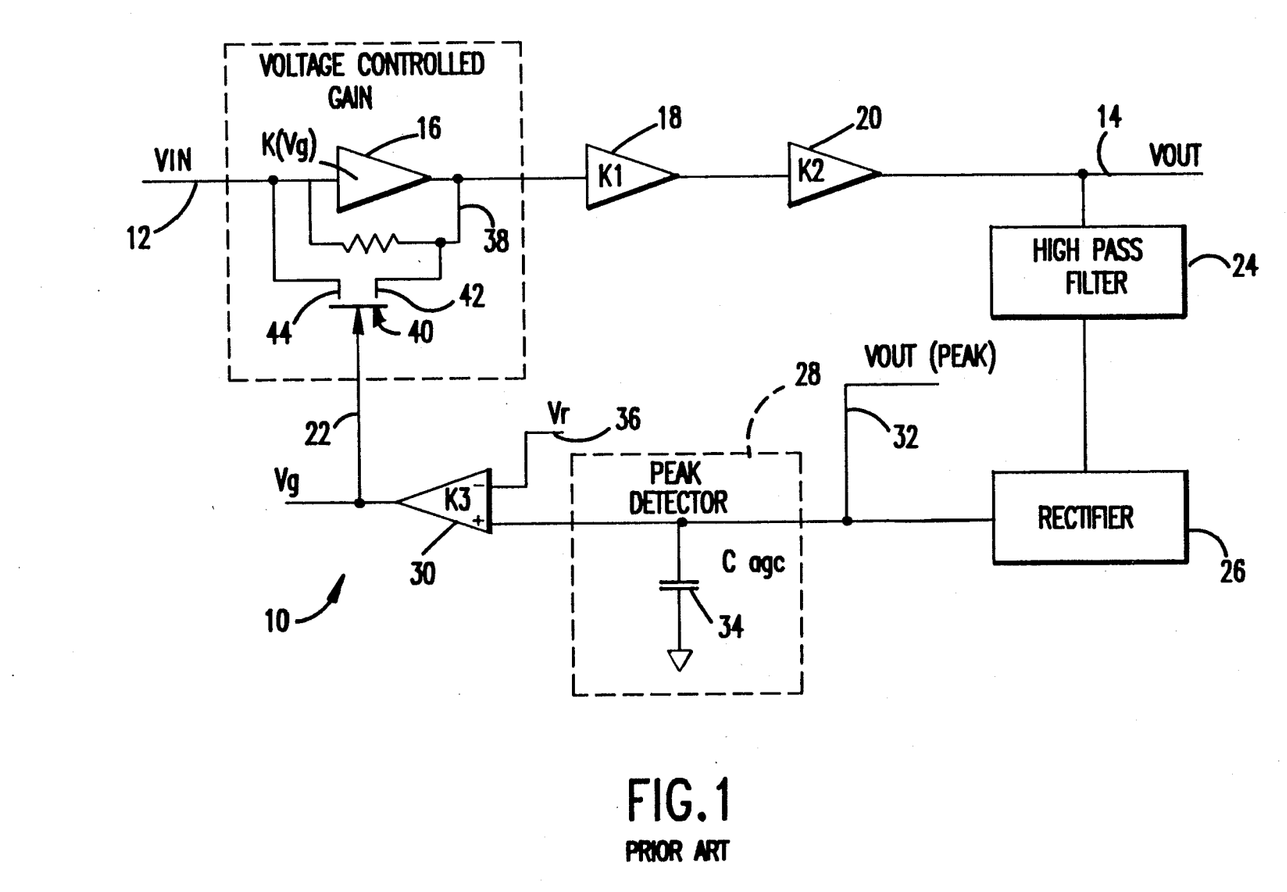
FIG. 1 is an electrical block diagram of the prior art automatic gain control circuit.

Turning now to the drawings, FIG. 1 is an electrical block diagram of the conventional automatic gain control circuit 10 utilized to control the gain in a laser scanning system receiver. The block diagram represents a single feedback path control circuit with an input signal 12 ($V_{in}$) and output signal 14 ($V_{out}$). The receiver comprises an amplifier section having at least three amplifiers 16, 18, and 20. It should be noted that the action of the AGC is not limited by the number of amplifier stages used in the receiver. The total number of amplifier stages used, depends on the gain limitation of each stage and the maximum receiver gain required by the application. The voltage gains of amplifiers 18 and 20 are fixed at $K_1$ and $K_2$, respectively, while the voltage gain $K(V_g)$, of amplifier 16 is variable and controlled by error voltage signal 22 ($V_g$). The output signal 14 is sensed in a feedback path comprising high pass filter 24, rectifier 26, peak-detector 28, and error amplifier 30 having a gain $K_3$. The AGC circuit 10 functions as follows The output of the receiver 14 is high pass filtered to prevent any low frequency components of the signal, such as those signals that are received due to ambient light in the scanner's environment, from interfering with proper gain adjustment of the receiver The output of the high pass filter 24 contains the alternating current (a.c.) component of the received signal 14 resulting from the bar code being scanned. This signal is rectified using a half wave rectifier 26. The output of the rectifier 26 is used to charge AGC capacitor 34 which consists of peak detector 28 AGC capacitor 34, at steady state, will be charged to a d.c. voltage 32 which will be proportional to the average peak amplitude of the received signal. The charge rate of AGC capacitor, which determines the attack time of the AGC, is determined by the output impedance and the cutoff frequency of the high pass filter 24. The attack time of this AGC can be reduced, at the expense of accuracy, by maximizing the amount of signal that will pass through the filter 24. This can be achieved by reducing the cutoff frequency of filter 24, and by reducing its output impedance. The automatic gain control action occurs dynamically as amplifier 30 compares the voltage difference between the average peak voltage signal 32 present on AGC capacitor 34, and a fixed reference voltage 36 ($V_r$), that for example, may be 1.2 volts dc. Essentially, the gain of amplifier 16 and hence overall receiver gain, is adjusted as amplifier 30 minimizes the voltage difference between voltage signals 36 and 32. The error voltage signal 22 which is indicative of this voltage difference, is generated from amplifier 30 and is used to control the resistance in the feedback 38 of amplifier 16. To adjust the gain, error voltage signal 22 is input to the gate of transistor 40, and due to the characteristics of transistor 40, dynamically controls the resistance between its drain and source terminals 42 and 44. This controllable resistance is connected in parallel with resistor 46 in the feedback path 38 and can therefore vary the gain ($V_g$) of amplifier 16. It should be noted that any means for automatically adjusting the gain of amplifier 16 using error voltage signal 22 is acceptable. For instance, in the present embodiment a JFET operating as a voltage controlled resistor is used. Other types of transistors or integrated circuits can be used to accomplish the same gain adjustment. As a result of minimizing the voltage difference present at the inputs of amplifier 30, the output signal 14 is regulated at a constant amplitude. Note that in this configuration, the output signal 14 will be unaffected by fluctuations in input signal 12.

Although this prior art embodiment of AGC circuit 10 is highly accurate, many cycles of input signal 12 are required before the output signal 14 has reached its steady state value. As mentioned above, this is due to the slow charge rate of AGC capacitor 34 in the feedback path. As a result, it takes a long time for the AGC to adjust receiver gain properly.

Figure 2:
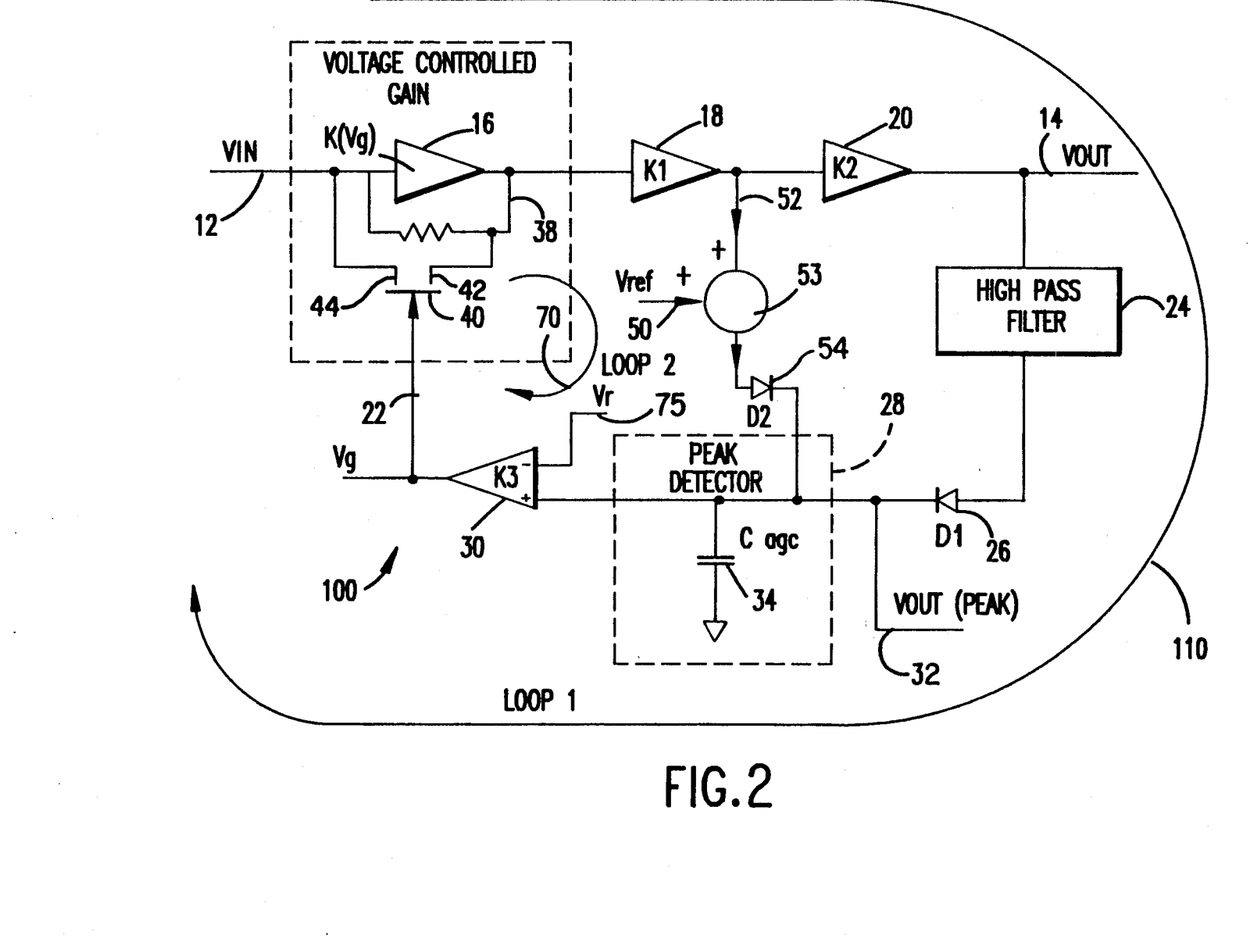
FIG. 2 is an electrical block diagram of the automatic gain control circuit of the present invention.

FIG. 2 is a block diagram of the automatic gain control circuit 100 of the present invention. As can be seen, first loop 110 is essentially the same AGC circuit and receiver as that illustrated in FIG. 1 and identical reference numbers are used to identify identical components. The distinguishing feature in circuit 100 is the presence of a second loop 70 which is used to sense the received signal at the output of amplifier 18. This additional feedback provides two functions that improve the response time of the AGC. The first function is that this loop introduces a d.c. reference voltage 50 (via adder 53) which is used to initialize AGC capacitor 34 with a voltage that will bias amplifier K3 in its linear region, and bias transistor 40 near its threshold voltage. Initializing capacitor 34 virtually eliminates AGC "dead time" because any subsequent change in the voltage on capacitor 34 will result in a change in receiver gain.

The second function this loop provides is a means for the output of amplifier 18 (via adder 53) to contribute charge to AGC capacitor 34. The output of amplifier 18 is not filtered and is capable of charging capacitor 34 with a negligible attack time. This loop is very fast in estimating what the final receiver gain should be.

Additional benefits result from this loop 70 because the output 52 of amplifier 18 is smaller in magnitude than the output 14. At times, signal 52 remains unclipped when the final output stage of the receiver 14 is saturated and therefore will be a better analog of the received signal 12. On occasions when the final output 14 is saturated, due to received large low-frequency ambient signals, this signal 52 is used to reduce receiver gain thereby bringing amplifier 20 out of saturation.

This second feedback loop 70, which is common to the first feedback loop 110 at AGC capacitor 34, does not compromise the accuracy of the steady state gain setting and, in fact, improves the overall response of the AGC circuit 100. Accuracy is not affected because the second loop 70 becomes electrically isolated from the AGC capacitor 34 before the receiver gain reaches steady state. The second loop 70 stops influencing the gain setting because as the voltage on the AGC capacitor 34 increases, the gain of the receiver is reduced which causes the magnitude of the signal at the output 52 of amplifier 18 to be reduced. As the AGC reaches steady state, the voltage on the AGC capacitor 34 cuts off diode 54 (D2) which isolates feedback loop 70 from the AGC. The point at which diode 54 is cutoff corresponds to a receiver gain that is higher than steady state by the gain of K2 of amplifier 20. In effect, this fast loop 70 has estimated, within an error of $K_2$, what the gain of the receiver should be. Once the second loop 70 is isolated from the AGC capacitor 34, the first loop 110 will then fine tune the receiver gain.

Figure 3:
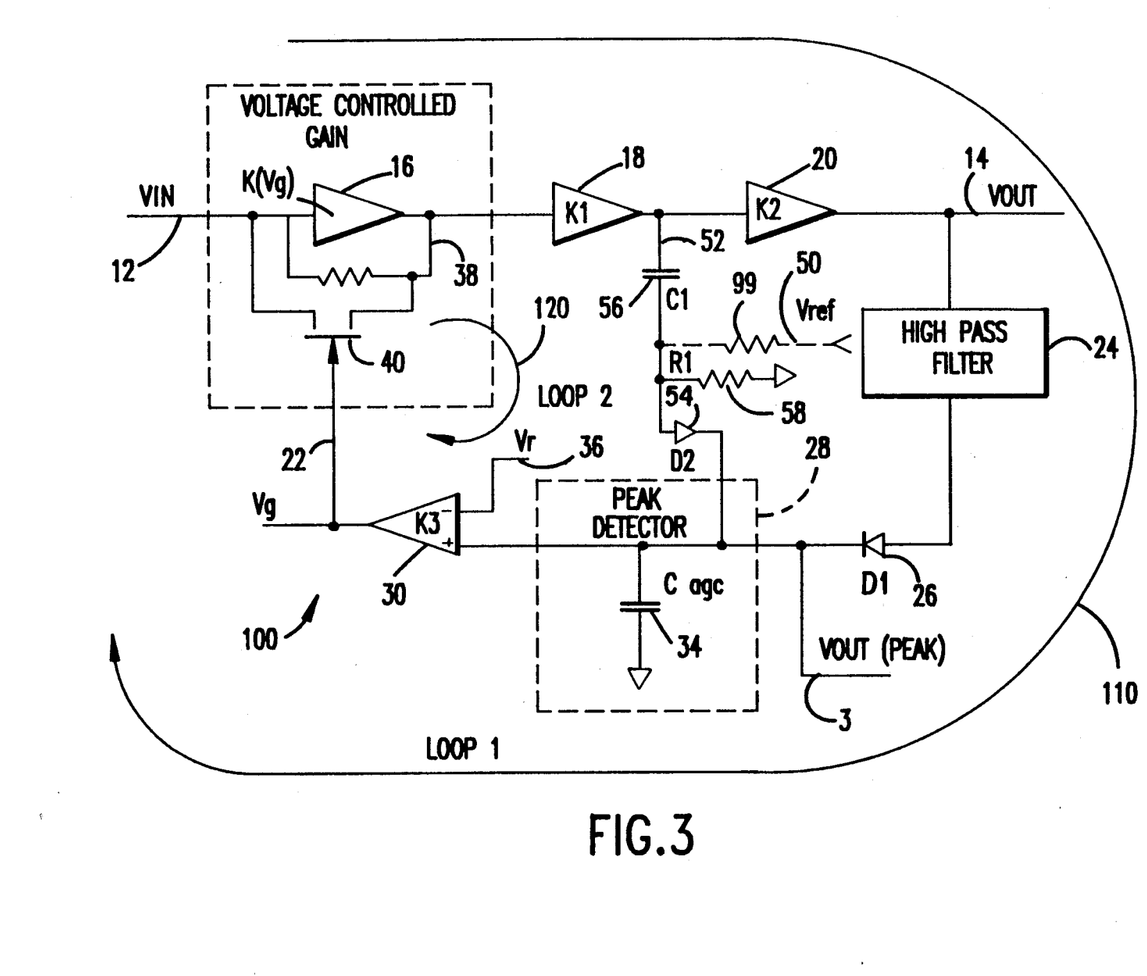
FIG. 3 is an electrical block diagram of a second embodiment of the automatic gain control circuit of the present invention.

FIG. 3 shows an alternative embodiment of automatic gain control circuit 100. In this embodiment, capacitor 56 and resistor 58 form a high pass filter in second loop 120 that couples only the ac component of second output signal 52 to AGC capacitor 34. As an option, resistor 99 may be used to initialize AGC capacitor 34 from a reference voltage 50. The magnitude of the initialization voltage is determined by a voltage divider comprising resistors 99 and 58. The component values of capacitor 56 and resistor 58 are chosen so as to provide a much lower cutoff frequency than the high pass filter 24 used in the first loop 110. Because of the high pass filtering in second loop 120, only the ac component of the second output signal 52 is used to initialize the voltage on AGC capacitor 34.

Figure 4:
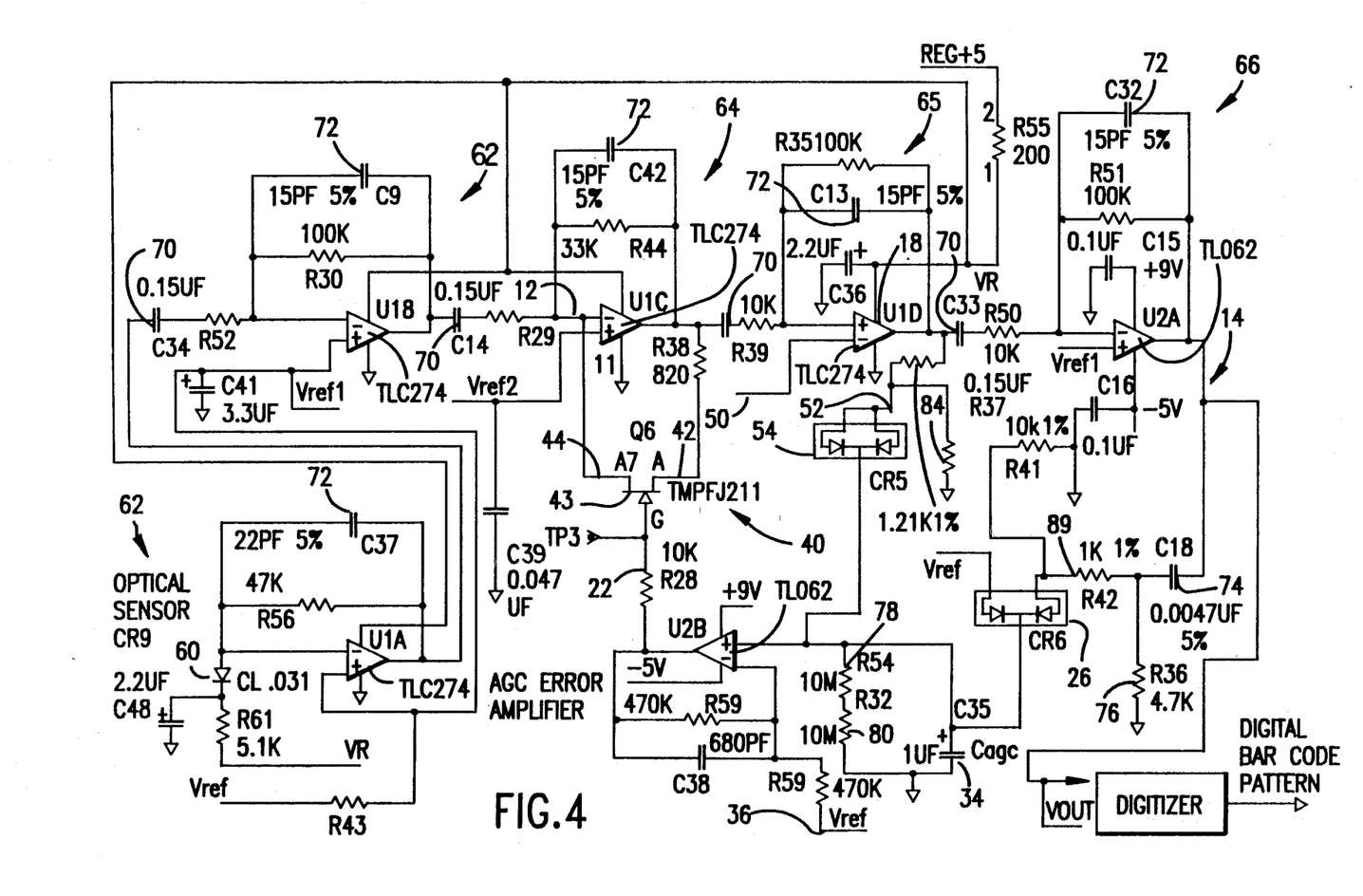
FIG. 4 is an electrical schematic diagram of the automatic gain control circuit of the present invention.

A detailed circuit diagram of the automatic gain control circuit 100, corresponding to the AGC circuit as illustrated in FIG. 2, is shown in FIG. 4. Referring to FIG. 4, the input voltage signal 12 is obtained by amplifying the signal obtained from the receiver's optical sensor means which is the reverse biased photodiode 60. Photodiode 60 acts as a light controlled current source. The output current of photodiode 60 is reflected as a negative voltage at the output of amplifier stage 62 which is part of the receiver. The receiver shows an amplifier chain comprised of five operational amplifier gain sections 62 through 66. Each stage has approximately the same high and low frequency roll off characteristic which results in a sharp pass-band filter having 3dB points for the high-pass and low-pass at approximately 27 KHz and 230 Hz, respectively. The high-pass filtering is achieved by using ac coupling capacitors 70 to link each amplifier stage. The ac coupling capacitors 70 block any dc component of the input signal 12 and also block any low frequency ripple caused by the scanning field of view. The low pass filtering is achieved by using capacitors 72 in parallel with the feedback resistor in each amplifier stage.

The overall gain of the amplifier stages is dynamically adjusted to maintain approximately a 4v peak-to-peak waveform at the output of amplifier stage 66 corresponding to amplifier 20 shown in FIG. 2. As mentioned previously, this is accomplished by using JFET transistor 40 as a voltage controlled variable resistor in the feedback path of amplifier stage 64. The resistance between the source 44 and drain 42 of transistor 40, and therefore the gain of amplifier stage 64 is controlled by the error voltage signal 22 applied to gate terminal 43. The error value is determined by the amplifier 30 which amplifies the difference between the rectified and filtered ac component of output signal 14 and a fixed reference voltage 36.

The components comprising the high pass filter 24 of FIG. 2 are shown in FIG. 4 as capacitor 74 and resistor 76 Resistor 89 is used for defining the output impedance of the high pass filter. AGC capacitor 34 which comprises peak detector (as shown in FIGS. 1, 2, and 3, as peak detector 28) along with resistors 78 and 80 stores the average peak value 32 of the steady state output voltage 14 of amplifier stage 66. Note that resistors 78 and 80 determine the decay time of the automatic gain control by providing a discharge path for AGC capacitor 34. The values of these resistors are normally very large and usually in the order of Mega ohms.

The second loop of AGC circuit (as shown in FIG. 2, as AGC circuit 100) includes voltage scaling resistors 82 and 84 and diode 54. As mentioned above, this feedback loop is used to deposit a fast dc voltage on AGC capacitor 34 which is derived from the dc bias voltage present on the output of amplifier stage 65 comprising amplifier 18. The dc bias voltage results from reference voltage 50 at the input of amplifier stage 65. This initial charge deposited on capacitor 34 virtually eliminates AGC "dead time" by biasing the output of amplifier 30 to a point close to the threshold voltage of transistor 40. The ac component of the output of amplifier stage 65 also contributes to the charging of AGC capacitor 34 and therefore improves AGC response time. Response time is also improved because the output of amplifier stage 65 is 180 degrees out of phase with respect to the receiver output signal 14. This phase difference allows both positive and negative excursions of input signal 12, which are reflected at the outputs of amplifier stages 65 and 66, to contribute to the charging of AGC capacitor 34.

It should be stressed that passive and active component values of the embodiment of present invention and the total number of amplifier stages in the receiver as shown in FIG. 4 are tailored to meet particular system requirements of the LS2000 laser scanning system manufactured by Symbol Technologies, Inc., 116 Wilbur Place, Bohemia, N.Y. 11716. The principles and teachings of the present invention can be adopted and applied for use in any receiver device used in a laser scanning system.

Figure 5:
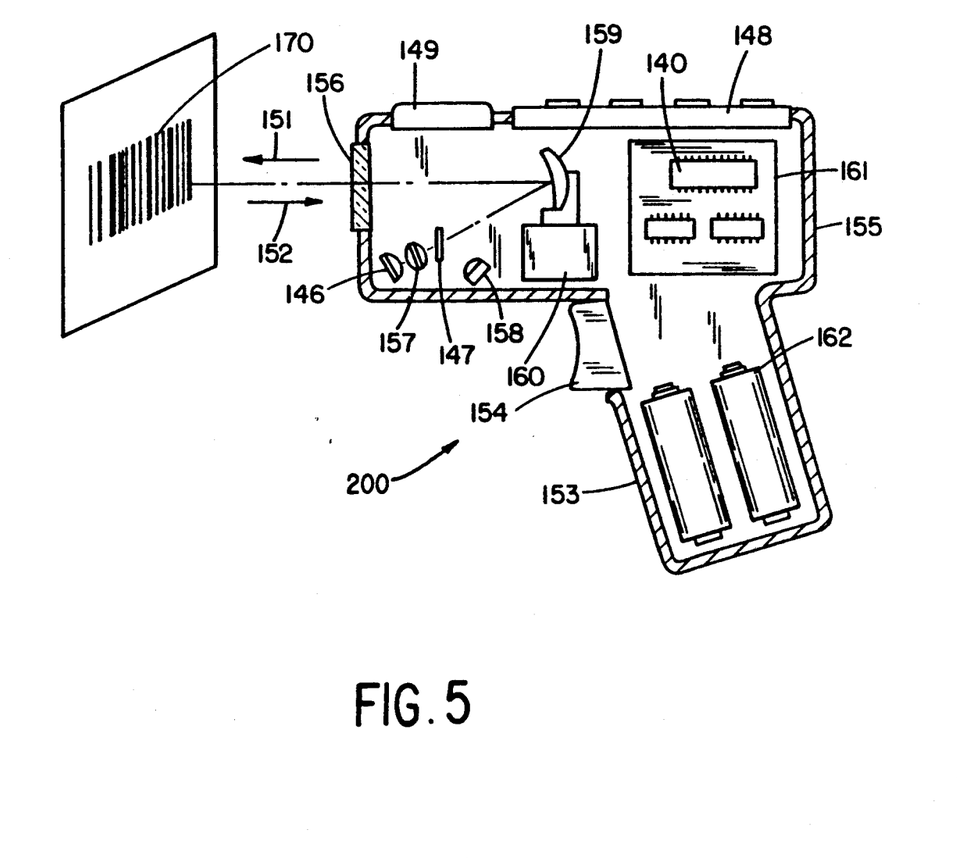
FIG. 5 is an illustration of a laser scanning gun.

The present invention may be implemented in a handheld, laser-scanning bar code reader unit such as illustrated in FIG. 5. In a preferred embodiment, the reader unit 200 is a gun-shaped device, having a pistol-grip type of handle 153 and movable trigger 154, employed to allow the user to activate the light beam 151 and detector circuitry when pointed at the symbol to be read, thereby saving battery life if the unit is self-powered. A light-weight plastic housing 155 contains the laser light source, the detector 158, the optics and signal processing circuitry, and the CPU 140, as well as power source or battery 162. A light-transmissive window 156 in the front end of the housing 155 allows the outgoing light beam 151 to exit and the incoming reflected light 152 to enter. The reader 200 is designed to be aimed at a bar code symbol by the user from a position in which the reader 200 is spaced from the symbol, i.e., not touching the symbol or moving across the symbol. Typically, this type of hand-held bar code reader is specified to operate in the range of perhaps several feet and scan the symbol 36 times each second.

As further depicted in FIG. 5, a suitable lens 157 (or multiple lens system) may be used to focus the scanned beam into the bar code symbol at an appropriate reference plane. A light source 146 such as a semiconductor laser diode is positioned to introduce a light beam into the axis of the lens 157, and the beam passes through a partially-silvered mirror 147 and other lenses or beam-shaping structure as needed, along with an oscillating mirror 159 which is attached to a scanning motor 160 activated when the trigger 154 is pulled. If the light produced by the source 146 is not visible, an aiming light may be included in the optical system. The aiming light, if needed, produces a visible-light spot which may be fixed, or scanned just like the laser beam; the user employs this visible light to aim the reader unit at the symbol before pulling the trigger 154.

Although the present invention has been described with respect to linear or single line bar codes, it is not limited to such embodiments, but may also be applicable to more complex scanning patterns and to stacked or two-dimensional bar codes such as Code 49 and similar symbologies. It is conceivable that the method of the present invention may also find application for use with various machine vision or optical character recognition applications in which information is derived from other types of indicia such as characters or from the surface characteristics of the article being scanned.

In all of the various embodiments, the elements of the scanner may be assembled into a very compact package that allows the scanner to be fabricated as a single printed circuit board or integral module. Such a module can interchangeably be used as the laser scanning element for a variety of different types of data acquisition systems. For example, the module may be alternately used in a hand-held scanner, a table top scanner attached to a flexible arm or mounting extending over the surface of the table or attached to the underside of the table top, or mounted as a subcomponent or subassembly of a more sophisticated data acquisition system.

The module would advantageously comprise a laser/optics subassembly mounted on a support, a scanning element such as a rotating or reciprocating mirror, and a photodetector component. Control or data lines associated with such components may be connected to an electrical connector mounted on the edge or external surface of the module to enable the module to be electrically connected to a mating connector associated with other elements of data acquisition system.

An individual module may have specific scanning or decoding characteristics associated with it, e.g. operability at a certain working distance, or operability with a specific symbology or printing density. The characteristics may also be defined through the manual setting of control switches associated with the module. The user may also adapt the data acquisition system to scan different types of articles or the system may be adapted for different applications by interchanging modules on the data acquisition system through the use of the simple electrical connector.

The scanning module described above may also be implemented within a self-contained data acquisition system including one or more such components as keyboard, display, data storage, application software, and data bases. Such a system may also include a communications interface to permit the data acquisition system to communicate with other components of a local area network or with the telephone exchange network, either through a modem or an ISDN interface, or by low power radio broadcast from the portable terminal to a stationary receiver.

It will be understood that each of the features described above, or two or more together, may find a useful application in other types of scanners and bar code readers differing from the types described above.

While the invention has been particularly shown and described with respect to preferred embodiments thereof, it will be understood by those skilled in the art that the foregoing and other changes in form and details may be made therein without departing from the spirit and scope of the invention, which should be limited only by the scope of the appended claims.

I claim:

1. In a scanning device for repetitively scanning a target, said device having a receiver including optical means for producing a signal from light reflected off said target, said receiver having an operating gain, and an automatic gain control circuit for dynamically adjusting said operating gain, said automatic gain control circuit comprising:

first feedback means from said receiver to sense said signal for automatically controlling said operating gain and means for automatically adjusting the gain of said receiver; and second feedback means from said receiver to also sense said signal and to improve the adjustment rate of said operating gain;

error correction means for providing an error voltage signal corresponding to the voltage difference between the average peak voltage signal and a fixed voltage reference;

said second feedback means being common to said first feedback means at an input of said error correction means, said second feedback means includes an isolation means for isolating said second feedback means from said first feedback means before the gain of said receiver reaches steady state.

2. The circuit as recited in claim 1, wherein said error correction means further comprises adjustment means for dynamically adjusting the gain of said receiver to minimize said error voltage signal.

3. The automatic gain control circuit as recited in claim 1 wherein the second feedback means includes means for reducing said operating gain prior to the time said operating gain has reached a steady state value.

4. The automatic gain control circuit as recited in claim 1 wherein said first feedback means includes filter means for filtering a receiver output signal indicative of the light reflected off said target and for providing an a.c. component therefrom;

rectifier means for rectifying said a.c. component to obtain an average peak voltage signal therefrom; and peak-detector means coupled to said rectifying means for maintaining a voltage indicative of the value of said average peak voltage signal.

5. The automatic gain control circuit as recited in claim 1 wherein the second feedback means includes means for reducing the time required to obtain said average peak voltage signal.

6. The automatic gain control circuit as recited in claim 1 wherein said second feedback means includes means to initialize the input of said error correction means with a fixed d.c. voltage independent of said signal resulting from light reflected off said target.

7. The automatic gain control circuit as recited in claim 1 wherein said receiver includes at least first, second, and third amplifier stages connected in tandem, said first feedback means from said receiver senses an output of said third amplifier stage and said second feedback means from said receiver senses an output of said second amplifier stage, said second amplifier stage being coupled intermediate said first and third stages.

8. The automatic gain control circuit as recited in claim 7 wherein said first amplifier stage has a variable gain control.

9. The automatic gain control circuit as recited in claim 8 wherein said filter means is a high pass filter.

10. The automatic gain control circuit as recited in claim 9 wherein said amplifier stages are operational amplifiers and said adjusting means includes a voltage controlled variable resistor means.

11. The automatic gain control circuit as recited in claim 10 wherein said voltage controlled variable resistor means is a field effect transistor.

12. The automatic gain control circuit as recited in claim 11 wherein said isolation means is a semiconductor diode.

13. The automatic gain control circuit as recited in claim 12 wherein said output of said third amplifier stage and said output of said second amplifier stage provide signals of opposite polarity.

14. The automatic gain control circuit as recited in claim 13 wherein said first, second, and third amplifier stages are capacitor coupled in tandem.

15. A method of operating a bar code scanner, comprising the steps of:
a) directing a light beam at a bar code symbol;
b) detecting light reflected from said bar code symbol in a receiver and generating an electrical signal in response thereto;
c) processing said electrical signal in a circuit having an adjustable gain;
d) providing first feedback means to sense said signal for producing a control signal for automatically adjusting the gain of said circuit;
e) providing second feedback means to also sense said signal and to produce a control signal for controlling the adjustment rate of said operating gain;
f) providing error correction mean for providing an error voltage signed corresponding to the voltage difference between the average peal voltage signal and a fixed voltage reference; and
g) changing the gain of said circuit in response to control signals form said first and second feedback means.

16. A method as defined in claim 15, further comprising the step of
dynamically adjusting the gain of said receiver to minimize said error voltage signal.

17. A method as defined in claim 15, further comprising the step of
reducing said operating gain prior to the time said operating gain has reached a steady state value.

18. A method as defined in claim 15, further comprising the steps of
filtering said electrical signal generated by said receiver indicative of the light reflected off said target and providing an a.c. component therefrom;
rectifying said a.c. component to obtain an average peak voltage signal therefrom; and
maintaining a voltage indicative of the value of said average peak voltage signal.

19. A method as defined in claim 15, further comprising the step of
reducing the time required to obtain said average peak voltage signal.

20. A method as defined in claim 15, further comprising the step of
initializing the input of said error correction means with a fixed d.c. voltage independent of said signal resulting from light reflected off said target.

* * * * *